United States Patent
Misso

[11] Patent Number: 6,091,574
[45] Date of Patent: Jul. 18, 2000

[54] STIFFENING ARM MASS DAMPER FOR A DISC DRIVE

[75] Inventor: Nigel Frank Misso, Bethany, Okla.

[73] Assignee: Seagate Technology, Inc., Scotts Valley, Calif.

[21] Appl. No.: 09/070,220

[22] Filed: Apr. 30, 1998

Related U.S. Application Data

[60] Provisional application No. 60/062,162, Oct. 16, 1997.

[51] Int. Cl.[7] .............................. G11B 5/48; G11B 21/16
[52] U.S. Cl. ............................................................ 360/104
[58] Field of Search .................................... 360/103, 104

[56] References Cited

U.S. PATENT DOCUMENTS

| | | | |
|---|---|---|---|
| 4,819,094 | 4/1989 | Oberg ....................................... | 360/104 |
| 5,299,081 | 3/1994 | Hatch et al. ............................. | 360/104 |
| 5,404,636 | 4/1995 | Stefansky et al. . | |
| 5,461,525 | 10/1995 | Christianson et al. ................... | 360/104 |
| 5,801,905 | 9/1998 | Schirle et al. ........................... | 360/104 |
| 5,812,342 | 9/1998 | Khan et al. .............................. | 360/104 |
| 5,825,590 | 10/1998 | Ohwe ....................................... | 360/104 |
| 5,850,319 | 12/1998 | Tangren ................................... | 360/104 |

FOREIGN PATENT DOCUMENTS

4-79085  3/1992  Japan .

*Primary Examiner*—William R. Korzuch
*Attorney, Agent, or Firm*—Crowe & Dunlevy

[57] ABSTRACT

An apparatus for changing the mechanical response characteristics of an actuator arm in a disc drive such that damage to the disc drive resulting from mechanical shock is prevented or minimized. An actuator arm is provided with a lightening hole in which is supported a stiffening arm mass damper and a retaining filler. The stiffening arm mass damper can be made of a stiffening material or a damping material as desired, such as a metallic cylindrical member, to change the mechanical response characteristics of the actuator arm to reduce contact between the actuator arm and the disc surface resulting from mechanical shock to the disc drive. The filler is preferably a moldable elastomeric material that substantially encapsulates the stiffening arm mass damper within the lightening hole.

8 Claims, 4 Drawing Sheets

STIFFENING ARM MASS DAMPER FOR A DISC DRIVE

RELATED APPLICATIONS

This application claims the benefit of U.S. Provisional Application Ser. No. 60/062,162 entitled ARM MASS DAMPER, filed Oct. 16, 1997.

FIELD OF THE INVENTION

This invention relates generally to the field of disc drive storage devices, and more particularly but not by way of limitation, to an improved stiffening arm mass damper for reducing the susceptibility of damage in disc drives resulting from non-operating mechanical shocks.

BACKGROUND OF THE INVENTION

Computers commonly use hard disc drives to store large amounts of data in a form that can be readily accessed by a user. A disc drive generally includes a stack of vertically spaced magnetic discs that are rotated at a constant high speed by a spindle motor. The surface of each disc is divided into a series of concentric, radially spaced data tracks in which the data is stored in the form of magnetic flux transitions. Typically, each data track is divided into a number of data sectors that store data blocks of a fixed size.

Data are stored and accessed on the discs by an array of read/write heads mounted to a rotary actuator assembly, which is also called an "E-block." Typically, the E-block includes a plurality of actuator arms which project outwardly from an actuator body to form a stack of vertically spaced actuator arms. The stacked discs and arms are configured so that the surfaces of the stacked discs are accessible to the heads mounted on the complementary stack of actuator arms. Head wires included on the E-block conduct electrical signals from the heads to a flex circuit, which in turn conducts the electrical signals to a flex circuit bracket mounted to a disc drive basedeck. For a general discussion of E-block assembly techniques, see U.S. Pat. No. 5,404,636 entitled METHOD OF ASSEMBLING A DISK DRIVE ACTUATOR, issued Apr. 11, 1995 to Stefansky et al., assigned to the assignee of the present invention.

The actuator body pivots about a cartridge bearing assembly which is mounted to the disc drive housing at a position closely adjacent the outer extreme of the discs. The actuator assembly includes a voice coil motor which enables the actuator arms and the heads attached thereto to be rotated about the cartridge bearing assembly so that the arms move in a plane parallel to the surfaces of the discs to selectively position a head over a preselected data track.

The voice coil motor includes a coil mounted radially outwardly from the cartridge bearing assembly, the coil being immersed in the magnetic field of a magnetic circuit of the voice coil motor. The magnetic circuit comprises one or more permanent magnets and magnetically permeable pole pieces. When current is passed through the coil, an electromagnetic field is established which interacts with the magnetic field of the magnetic circuit so that the coil moves in accordance with the well-known Lorentz relationship. As the coil moves, the actuator body pivots about the pivot shaft and the heads move across the disc surfaces.

Each of the heads is mounted to an actuator arm by a flexure which attaches to the end of the actuator arm. Each head includes an interactive element such as a magnetic transducer which either senses the magnetic transitions on a selected data track to read the data stored on the track, or transmits an electrical signal that induces magnetic transitions on the selected data track to write data to the data track. Air currents are caused by the high speed rotation of the discs. A slider assembly included on each head has an air bearing surface which interacts with the air currents to cause the head to fly at a short distance above the data tracks on the disc surface.

A continuing trend in the industry is the reduction in the size of modern disc drives. As a result, the discs in the disc stacks of modern disc drives are increasingly being brought closer together, providing narrower vertical gaps between adjacent discs. This trend toward decreasing size is driving the industry toward smaller heads, longer and thinner actuator arms and thinner gimbal assemblies. Although these and other size reductions facilitate greater storage capacity, such narrow vertical spacing of the discs and thinning of the actuator arms gives rise to a problem of increased sensitivity of the disc drives to non-operating mechanical shocks.

Non-operating mechanical shocks can cause significant deflection of the discs, leading to catastrophic damage to the disc media and heads. More particularly, disc to arm contact can induce a shock wave large enough to travel down to the flexure assemblies and heads, causing the heads to lift off of the disc surfaces as a result of the relatively flexible flexure assemblies to which the heads are attached. The heads can thus obtain significant velocities as they accelerate away from and then back toward the discs. When such velocities are sufficiently severe, damage can occur to the heads and the surfaces of the discs as the heads strike the landing zone portions of the discs. Moreover, should a head tilt during such liftoff, a corner of the head can strike the disc surface, increasing the probability of damage to the head or the disc.

That is, such non-operating mechanical shocks, often encountered during shipping and other handling of disc drives, can cause the actuator arm tips to contact the media on the discs. When a non-operating shock is encountered, the discs and actuator arms vibrate, causing displacement of the actuator arms and discs in a vertical direction (often referred to in the industry as the "Z-axis"). The discs and actuator arms oscillate about the positions held prior to encountering the non-operating shock. Because the actuator arms have different characteristics than the discs, the oscillation of the actuator arms occurs at a different frequency than the oscillation of the discs. As a result, the wavefunctions for the oscillations of the actuator arms and discs become out of phase, which means that the actuator arms and discs move either toward or away from each other. If the amplitude of the displacement is large enough, the tips of the actuator arms contact the discs. The resulting contact, which can damage the surfaces of the discs, the heads and the actuator arms, has been recognized as a predominant failure mode in modern disc drives.

Although little can be done to completely eliminate contact between the actuator assembly (the heads, actuator arms or both) and the discs of a disc drive, it is desirable to reduce the amplitude of the force of impact as well as the number of impacts which are encountered for any non-operational shock. Thus, there is a need for an improved approach to reducing the susceptibility of damage in disc drives resulting from non-operating mechanical shocks.

SUMMARY OF THE INVENTION

The present invention relates to actuator arms having stiffening arm mass dampers for reducing the susceptibility of damage in disc drives resulting from non-operating mechanical shocks.

In accordance with a preferred embodiment, the properties of an actuator arm of a disc drive is changed by providing a lightening hole in the actuator arm and positioning a stiffening arm mass damper within the lightening hole.

A retainer or filler is used to secure the stiffening arm mass damper within the lightening hole, the retainer comprising an elastomeric material molded in the lightening hole to substantially encapsulate and secure the stiffening arm mass damper within the lightening hole. The stiffening arm mass damper is a member having a larger dimension along a direction substantially parallel to the longitudinal axis of the actuator arm, and having a lesser dimension in axes normal to the longitudinal axis of the actuator arm.

These and various other features as well as advantages which characterize the present invention will be apparent from a reading of the following detailed description and a review of the associated drawings.

DETAILED DESCRIPTION

Figure 1:
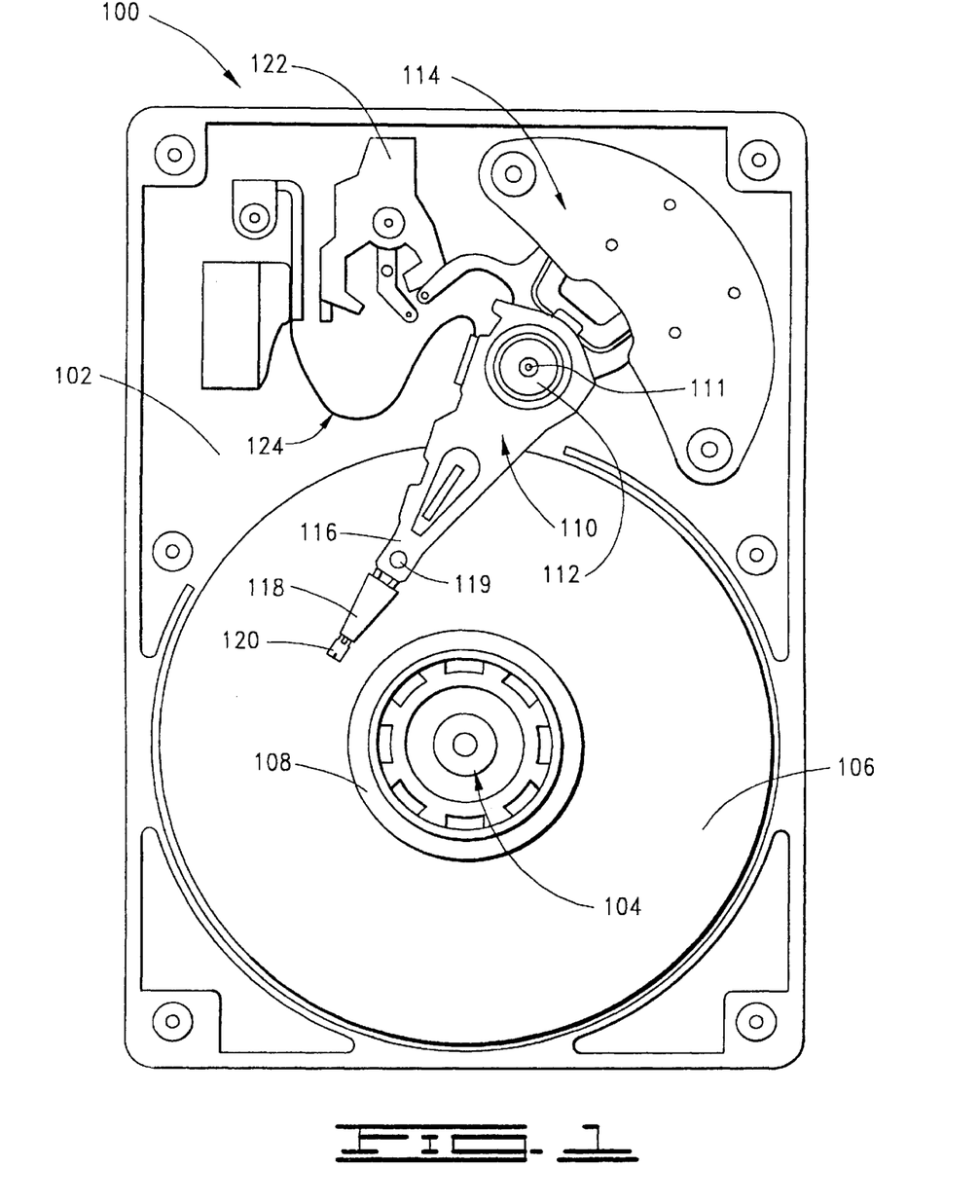
FIG. 1 is a top plan view of a disc drive constructed in accordance with a preferred embodiment of the present invention.

Turning now to the drawings and more particularly to FIG. 1, shown therein is a top plan view of a disc drive 100 constructed in accordance with a preferred embodiment of the present invention. The disc drive 100 includes a base deck 102 to which various components of the disc drive 100 are mounted. A top cover, which has been omitted from FIG. 1 to facilitate the present discussion, cooperates with the base deck 102 to form an internal, sealed environment for the disc drive 100.

A spindle motor 104 is provided to rotate a stack of discs 106 at a constant high speed. A disc clamp 108 secures the discs 106 to a hub (not separately designated) of the spindle motor 104.

To transfer data to and from the discs 106, a controllably positionable actuator assembly 110 is provided which rotates about a shaft 111 of a cartridge bearing assembly 112 in response to currents applied to a coil (not separately designated) of a voice coil motor (VCM) 114. The actuator assembly 110 includes a plurality of actuator arms 116 having corresponding flexure assemblies 118 attached thereto about swaging holes 119. Heads 120 are provided at distal ends of the flexure assemblies 118 and are supported over the discs 106 by air bearings established by air currents set up by the rotation of the discs 106. A latch assembly 122 is provided to secure the heads 120 over landing zones at the innermost diameters of the discs 106 when the disc drive 100 is deactivated. A flex circuit assembly 124 provides electrical communication paths between the actuator assembly 110 and a disc drive printed circuit board (not shown in FIG. 1) mounted to the underside of the disc drive 100 in a conventional manner.

Figure 2:
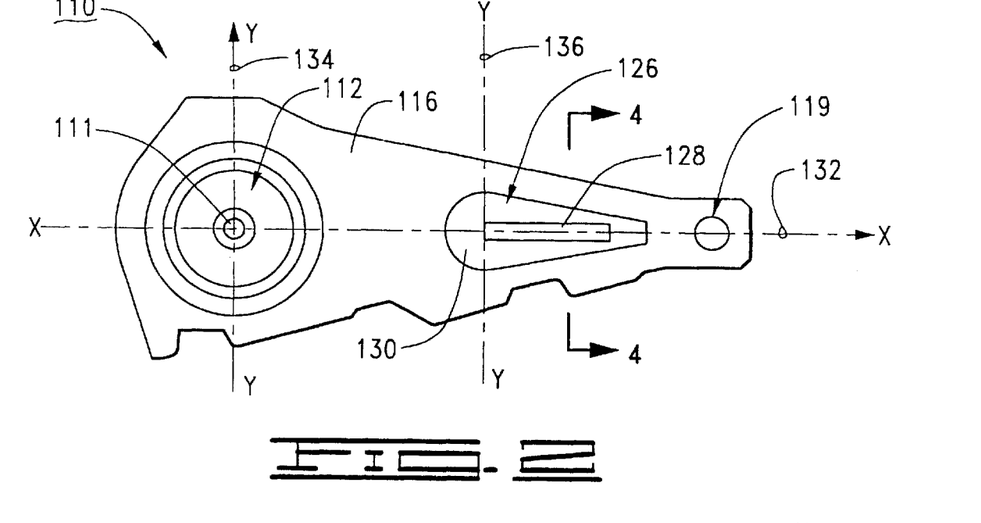
FIG. 2 is a plan view of the actuator arm of the disc drive of FIG. 1, the actuator arm having some of its components removed for the present description.

Referring now to FIG. 2, shown therein is a plan view of the actuator assembly 110 which is constructed in accordance with a preferred embodiment of the present invention. As shown in FIG. 2, certain parts of the actuator assembly 110 are omitted, such as the flexure assemblies 118, the heads 120 and the flex circuit 124. Each actuator arm 116 has a cavity or "lightening hole" 126 which can be formed in a variety of selected shapes. Lightening holes, such as the lightening hole 126, are typically used to reduce the amount of material needed to construct the arms, thereby reducing the mass of the arms. This reduction in material lightens the actuator arms results in a reduction in the control effort necessary to move the heads 120 from track to track during a side operation.

In accordance with a preferred embodiment of the present invention, a stiffening arm mass damper 128 is disposed within the lightening hole 126 of each actuator arm 116 of the actuator assembly 110. The stiffening arm mass damper 128 is retained in position within the lightening hole 126 by a filler 130. In a particularly preferred embodiment, the stiffening arm mass damper 128 is cylindrically shaped piece of selected metal, such as a cylindrically shaped, stainless steel pin, but the present invention is not necessarily limited by the shape of the stiffening arm mass damper, except as discussed further hereinbelow. Insofar as the cross sectional profile of the stiffening arm mass, any desired shape is acceptable, such as rectangularly shaped members or members having an I-beam cross sectional profile.

Preferably, the filler 130 is a moldable, elastomeric or polymeric material. The filler 130 disposed within the lightening hole of the actuator arm serves to retain the stiffening arm mass damper 128 within the lightening hole 126 of the actuator arm 116 and communicates the mechanical characteristics of the stiffening arm mass damper 128 to the actuator arm 116.

One acceptable material for serving as the filler 130 is an ethylene acrylic elastomer Vamac® (a registered trademark of E. I. du Pont); another is a family of fluoroelastomers available under the trademark of Viton®, also a registered trademark of E.I. du Pont de Nemours & Co., Inc., Wilmington, Del. The selected filler material is preferably molded in the lightening hole of the actuator arm by a conventional molding process, and the stiffening arm mass damper can be held in position within the lightening hole during the molding process via conventional means, thereby encapsulating, or substantially encapsulating, the selected stiffening arm mass damper.

Figure 3:
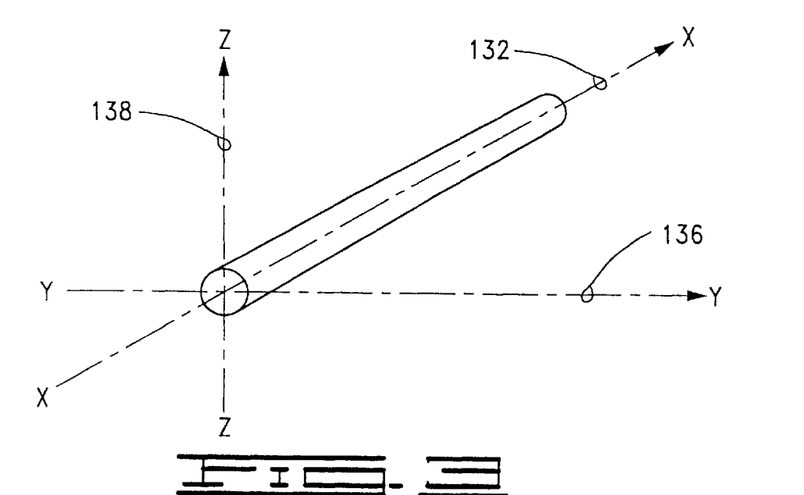
FIG. 3 is a perspective view of the stiffening arm mass damper portion of the actuator arm of FIG. 2.

FIG. 3 is a perspective view of the stiffening arm mass damper 128, depicted apart from the actuator arm 116 and showing the preferred shape thereof. For purposes of the present description, it will be useful to reference the axes shown in FIGS. 2 and 3 for the actuator arm 116 and the stiffening arm mass damper 128, respectively. As shown in FIG. 2, an X-axis 132 of the actuator arm 116 is a line which passes through the central longitudinal axis (the Z axis thereof, although not designated in FIG. 2) of the shaft 111 of the cartridge bearing assembly 112 and through the center line of the swaging hole 119 and onward through the center of the head 120. Thus, the X-axis 132 essentially bisects the actuator arm 116 into two halves along the length of the actuator arm 116. There is a first Y-axis 134 designated for each actuator arm 116 that is 90 degrees to the X-axis 132 and passes through the shaft 111, as shown in FIG. 2. There also is a second Y-axis 136 that is designated to extend at 90 degrees to the X-axis 132 at one end of the stiffening mass damper 128 as depicted in FIG. 2.

The X-axis 132 and the second Y-axis 136 are depicted graphically in FIG. 3, and a perpendicular Z-axis 138 is also depicted. The stiffening mass damper 128 is shown in FIG. 3 imposed upon the X, Y and Z-axes 132, 136 and 138, respectively.

The stiffening mass damper 128 has a greater dimension in one dimension than in the two other dimensions. That is, the length of the stiffening mass damper 128 extends along the X-axis 132. And as shown, the width and thickness dimensions extend along the Y-axis 136 and the Z-axis 138, respectively. Thus, the dimensions of the stiffening mass damper 128 are less along each of the Y-axis 136 and the Z-axis 136 than in the direction of the X-axis 132.

As will now be clear from a review of FIG. 2, the stiffening mass damper 128 is aligned in the lightening hole 126 of the actuator arm 116 so that its X-axis 132 is substantially parallel to, or coincidental with, the longitudinal axis or length of the actuator arm 116.

Figure 4:
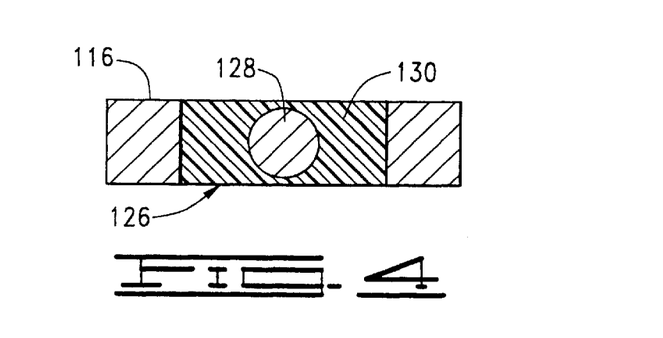
FIG. 4 is a cross-sectional of the actuator arm taken at 4—4 in FIG. 2.

FIG. 4 shows a cross sectional view of the actuator arm 116 taken through the stiffening mass damper 128 at 4—4 in FIG. 2. Although the stiffening mass damper 128 is shown in FIG. 2, the view of FIG. 4 depicts the filler 130 as totally encapsulating the mass damper 128, with the upper and lower surfaces being substantially co-planar with the upper and lower surfaces of the actuator arm 116 it will be understood, however, that the present invention is not so limited. The cylindrical shape is preferred for the stiffening mass damper 128 because of the availability of precision diameter metal, ceramic and polymeric rod stock, and since the weight of the stiffening mass damper 128 is determined by the weight reduction desired, the rod stock offers a means for easily establishing precision control of the weight of the stiffening mass damper 128 as required for any particular actuator arm. It is believed that the cross section and length of the stiffening arm mass damper are not critical to the practice of the present invention, as long as the dimensions of the stiffening mass damper 128 are established so that such has a greater dimension along the X-axis 132 than in either of the two remaining axes. Further, while the material of choice for the stiffening arm mass damper 128 will preferably be taken from the large number of materials that are now readily available (such as stainless steel), it will be understood that the present invention is not limited by the selection, of such as there are many ceramics, plastics and the like which may have desirable properties and which can be found acceptable, depending upon the requirements of a given application.

The stiffening mass damper 128 has length, width and height dimensions which generally correspond in orientation to the length, width and height dimensions of the actuator arm 116. The length dimension of the stiffening mass damper 128 is longer than either the width or height dimensions, and the length of the stiffening mass damper 128 is oriented in the lightening hole 126 in substantially alignment with the length of the actuator arm 116.

The stiffening arm mass damper 128 advantageously changes the mechanical response characteristics of the actuator assembly 110 so as to minimize damage to the disc drive 100. As explained more fully hereinbelow, careful selection of the material from which the stiffening arm mass damper 128 is made, and to a lesser degree the selection of the filler 130, allows the actuator arms 116 to be designed to provide particular types of mechanical response characteristics, for example stiffening or damping characteristics.

Figure 5:
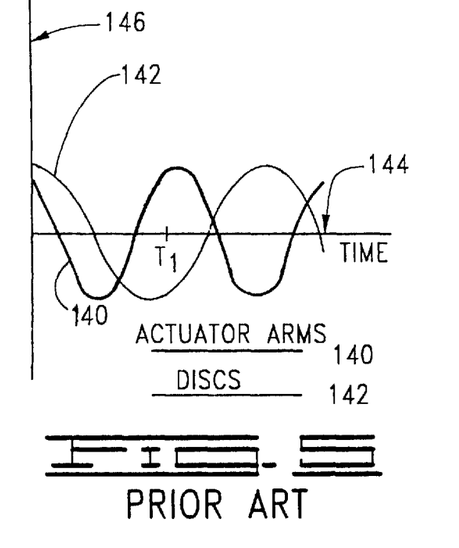
FIG. 5 is a graphical representation of wavefunctions for the oscillation of the discs and prior art actuator arms upon encountering a typical non-operational shock.

FIG. 5 is a graphical representation of the wavefunctions for the oscillation of the discs 106 and prior art actuator arms upon encountering a typical non-operational shock. An actuator arm wavefunction 140 (depicted by a thick line) and a disc wavefunction 142 (depicted by a thin line) are each plotted as a function of time on a horizontal axis 144 and a function of displacement on a vertical axis 146. It will be noted that the wavefunctions 140, 142 have different frequencies of oscillation. The larger the difference between the two wavefunctions for a given time, the more likely it is that there will be contact undesirable between the discs 106 and the heads 120 or actuator arms 116.

For instance, at time $T_1$ on the axis 144, the magnitude of the displacement of the actuator arm 116 (wave function 140) is large in the positive direction, while the magnitude of the displacement of the discs 106 (wave function 142) is large in the negative direction. This indicates that the actuator arms 116 and discs 106 are moving toward each other, which is when contact between the actuator arms 116 and discs 106 is most likely to occur. If the amplitude of the displacement is large enough, the actuator arms 116 and discs 106 will contact, and the larger the amplitude of displacement, the greater the force of the contact.

Figure 6:
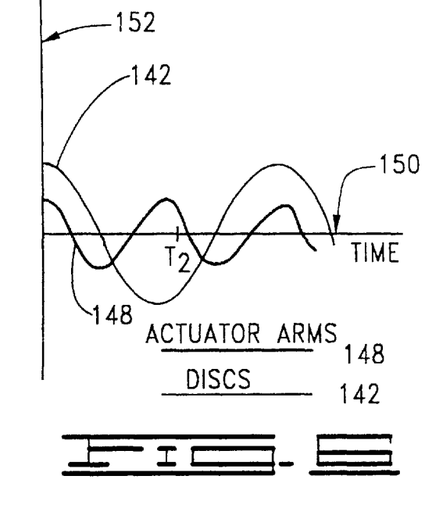
FIG. 6 is a graphical representation of wavefunctions for the oscillation of the discs and actuator arms of the disc drive of FIG. 1 in which the actuator arm is provided a stiffening arm mass damper made of a selected material.

Generally, the stiffening arm mass damper 128 will be made of a material which will provide increased stiffness to the actuator arm 116. FIG. 6 is a graphical representation of the wavefunctions for the oscillation of the discs 106 and the actuator arms 116 upon encountering a typical non-operational shock where the stiffening arm mass dampers 128 have been made using a stiffening material in accordance with a preferred embodiment. An actuator arm wavefunction 148 and disc wavefunction 142 (of FIG. 5) are each plotted as a function of time on a horizontal axis 150 and a function of displacement on a vertical axis 152.

As shown graphically in FIGS. 5 and 6, the increased stiffness of the actuator arms 116 resulting from the stiffening arm mass dampers 128 decreases the amplitude of the displacement of the actuator arms 116 resulting from a non-operational shock to the disc drive 100. This decrease in the amplitude of the displacement of the actuator arms 116 decreases the likelihood that the heads 120 or actuator arms 116 will contact the surface of the discs 106 and, at a minimum, reduces the amplitude of the force of impact with the discs 106, as demonstrated by a comparison of time $T_2$ of FIG. 6 with corresponding time $T_1$ of FIG. 5. Those skilled in the art will recognize that the stiffening arm mass dampers 128 also provide increased stiffness to the actuator arms 116 in the X-Z plane, thereby improving the performance of the actuator arms 116 during a seek operation.

Figure 7:
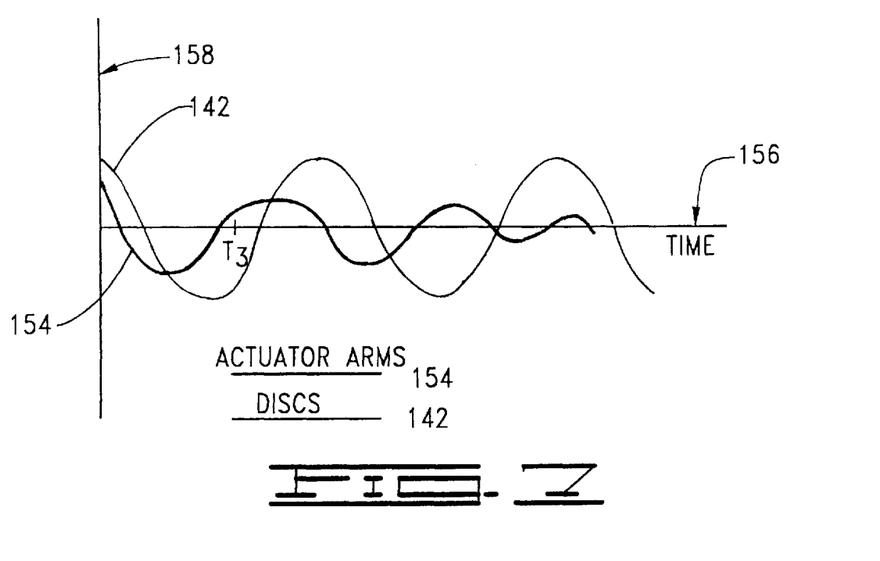
FIG. 7 is a graphical representation of wavefunctions for the oscillation of the discs and actuator arms of the disc drive of FIG. 1 in which the actuator arm is provided a stiffening arm mass damper made of another selected material.

Alternatively, the stiffening arm mass dampers 128 can be made from a somewhat softer material designed to provide damping characteristics to the stiffening arm mass dampers 128, and such characteristics are in turn imparted to the actuator arms 116. FIG. 7 is a graphical representation of the disc wavefunction 142 (thin line) and actuator arm wavefunction 154 (thick line) upon encountering a typical non-operational shock where the stiffening arm mass dampers 128 have been made using a damping material in accordance with this somewhat softer material. The actuator arm wavefunction 154 and the disc wavefunction 142 are plotted as a function of time along a horizontal axis 156 and a function of displacement on a vertical axis 158. It will be noted from a review of FIG. 7 that the wavefunction 154 (thick line) dies quickly; that is, the amplitude and frequency quickly reduces along the time line, a distinct advantage of the present invention as this reduces the likelihood of damaging contact between the actuator arms and the discs.

As shown graphically in FIGS. 5 and 7, damping of the actuator arms 116 decreases the amplitude of oscillation of the actuator arms 116, thereby decreasing the number of contacts between the discs 106 and actuator arms 116 or heads 120 for any given non-operational shock. Although the initial amplitude of the actuator arm wavefunction may not be decreased, the amplitude is quickly diminished thereafter. This reduces the amplitude of the force of impact with the discs 106, as demonstrated from a comparison of $T_1$ of FIG. 5 and $T_3$ of FIG. 7.

Figures 8, 9:
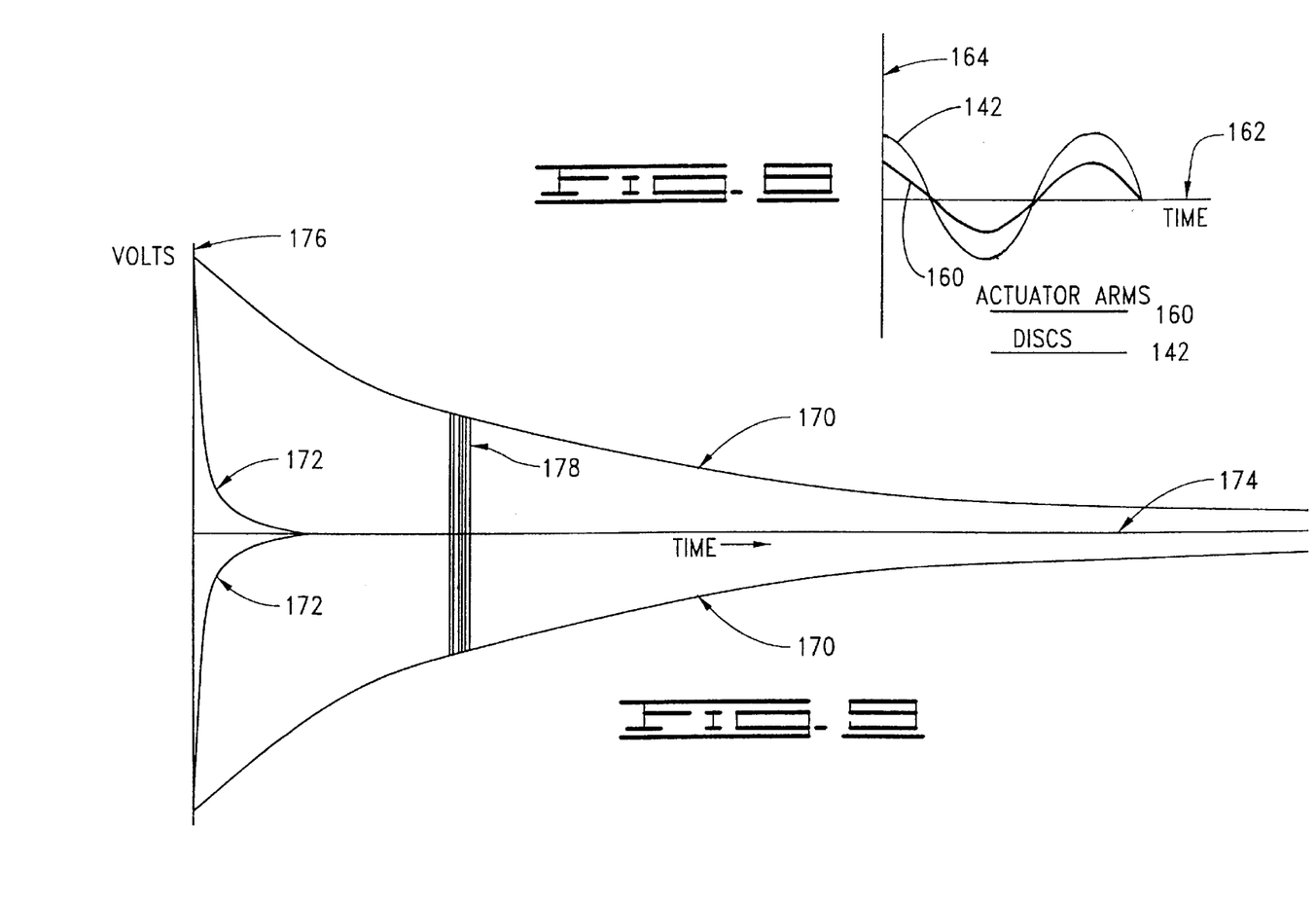
FIG. 8 is a graphical representation of wavefunctions for the oscillation of the discs and actuator arms of the disc drive of FIG. 1 in which the actuator arm is provided a stiffening arm mass damper made of yet another selected material wherein the actuator arms have been tuned to the frequency of the discs.
FIG. 9 is a graphical representation of amplitude-time envelopes indicative of mechanical displacement responses of a prior art actuator arm and an actuator arm constructed in accordance with a preferred embodiment.

The properties of the material used for making the stiffening arm mass dampers 128 can be carefully selected so that the actuator arms 116 and discs 106 have the same frequency of oscillation. In other words, the stiffening arm mass dampers are selectively calibrated by adjusting the mass of the stiffening arm mass dampers so that when the stiffening arm mass dampers together with the filler material are attached to the lightening holes of the actuator arms, the actuator arms are tuned to oscillate at the same frequency as the discs in response to a typical non-operating shock encounter. FIG. 8 is a graphical representation of the disc wavefunction 142 for the oscillation of the discs 106 (thin line) and a corresponding wavefunction 160 for the actuator arms 116 (thick line) upon encountering a typical non-operational shock where the stiffening arm mass dampers 128 have been made of a material designed to "tune" the frequency of the actuator arms 116 to the frequency of the discs 106. The actuator arm wavefunction 160 and the disc wavefunction 142 are plotted as a function of time along a horizontal axis 162 and a function of displacement along a vertical line 164. Such "tuning" of the actuator arms 116 can be used to eliminate contact between the actuator arms 116 and discs 106 because the actuator arms 116 and the discs 106 move substantially in unison (i.e., at the same frequency), as demonstrated in FIG. 8.

As known in the manufacturing of disc drives such as that of the disc drive 100 (FIG. 1), it is conventional to test the actuator arms to determine the magnitude and dampening time for the arms. That is, an arm ping test is conducted wherein an actuator arm is securely fixed at one in a test fixture and a force is delivered to the cantilevered distal end by a striking instrument much in the manner of tuning a piano chord. The oscillations of the flexing distal end of the actuator arm are plotted via a transducer or the like and the results recorded. That is, the magnitude of displacement in is tracked in volts and the time of duration of the oscillations is recorded.

FIG. 9 represents such a plot and shows a first amplitude-time envelope 170 and a second amplitude-time envelope 172 depicted on a graph showing elapsed time in seconds a horizontal axis 174 and magnitude of arm displacement (in volts) along a vertical axis 176. It will be understood that the first and second amplitude-time envelopes 170, 172 represent the maximum displacement values for the respective actuator arms being tested, the purpose of which will now be discussed. To illustrate this, a small portion of the actual oscillation tracking pen markings is depicted at 178, with points at the upper and lower reaches of the displacements forming the amplitude-time envelope 170.

The amplitude-time envelope 170 represents the results of a prior art actuator arm (not shown) with the same physical dimensions and characteristics as the actuator arm 116 shown in FIG. 3 with the exception that such prior art actuator arm does not have the stiffening arm mass damper 126 discussed above. The amplitude-time envelope 172 represents the results of the stiffening arm mass damper 128 as shown in FIG. 3. Both the prior art actuator arm and the actuator arm 116 were subjected to the arm ping test described above, and the curves of the amplitude-time envelopes 170 and 172 depict the results, respectively.

As shown in FIG. 9 the oscillations of the actuator arm 116 (amplitude-time envelope 172) is at the same initial amplitude and duration of oscillation time as the initial amplitude and duration of oscillation time for the unmodified, prior art actuator arm (amplitude-time envelope 170). The beneficial results of this are compelling in the prevention of actuator arm/head and disc contact from non-operational shock, and for reducing the time duration for such potential contacts.

Accordingly, in view of the foregoing discussion it will be clearly understood that the present invention is directed to an apparatus for minimizing damage to a disc drive (such as 100) from the application of a mechanical shock to the disc drive, the apparatus including an actuator arm (such as 116) having a lightening hole (such as 126) in which is disposed a stiffening mass damper (such as 128) supported therein by a filler (such as 130), thereby changing the mechanical response characteristics of the actuator arm so as to minimize damage resulting from contact between the actuator arm and a disc (such as 106) of the disc drive.

It will be clear that the present invention is well adapted to attain the ends and advantages mentioned as well as those inherent therein. While presently preferred embodiments have been described for purposes of disclosure, numerous changes may be made which will readily suggest themselves to those skilled in the art and which are encompassed in the spirit of the invention disclosed and as defined in the appended claims.

What is claimed is:

1. An improved actuator assembly in a disc drive having a disk, the actuator assembly comprising:

an actuator arm having a lightening hole therein; and a selectively calibrated stiffening arm mass damper disposed within the lightening hole of the actuator arm for tuning the frequency of oscillation of the actuator arm to the frequency of oscillation of the disc; and an elastomer which retains the stiffening arm mass damper in the lightening hole.

2. The improved actuator assembly of claim 1 wherein the stiffening arm mass damper is longer in one dimension than in the other two dimensions.

3. The improved actuator assembly of claim 2 wherein the longest dimension of the stiffening arm mass damper is aligned with the longest dimension of the actuator arm.

4. The improved actuator assembly of claim 3 wherein the stiffening arm mass damper is an elongated cylindrical member.

5. The improved actuator assembly of claim 3 wherein the stiffening arm mass damper has a substantially rectangular cross section.

6. The improved actuator assembly of claim 3 wherein the stiffening arm mass damper has a substantially I-Shaped cross section.

7. A disc drive assembly, comprising:

a base deck;

a spindle motor mounted to the base deck and having a central axis;

a disc mounted to the spindle motor for rotation about the central axis, the disc having a disc surface defining a plane;

an actuator assembly mounted to the base deck adjacent the disc and having an actuator axis parallel to the central axis about which the actuator assembly is controllably rotatable, wherein the actuator assembly comprises:

an actuator arm extendable over the disc surface, the actuator arm having a lightening hole therein and having an actuator length dimension which is perpendicular to the actuator axis;

a selectively calibrated stiffening arm mass damper disposed within the lightening hole of the actuator arm for tuning the frequency of oscillation of the actuator arm to the frequency of oscillation of the disc, the selectively calibrated stiffening arm mass damper comprising:

an elongated rod member having a stiffening arm mass damper length dimension parallel to the actuator arm length dimension, a stiffening arm mass damper width dimension perpendicular to the stiffening arm mass damper length dimension and parallel to the plane of the disc surface, and a stiffening arm mass damper thickness dimension perpendicular to the stiffening arm mass damper length and width dimensions; and wherein the stiffening arm mass damper length dimension is substantially greater than the stiffening arm mass damper width dimension and substantially greater than the stiffening arm mass damper thickness dimension; and an elastomer disposed within the lightening hole of the actuator arm retaining the selectively calibrated stiffening arm mass damper within the lightening hole of the actuator arm and for communicating the mechanical characteristics of the selectively calibrated stiffening arm mass damper to the actuator arm.

8. The disc drive assembly of claim 7 wherein the selectively calibrated stiffening arm mass damper is an elongated cylindrical member.

* * * * *

UNITED STATES PATENT AND TRADEMARK OFFICE
CERTIFICATE OF CORRECTION

PATENT NO. : 6,091,574
DATED : July 18, 2000
INVENTOR(S) : Nigel F. Misso

It is certified that error appears in the above-identified patent and that said Letters Patent is hereby corrected as shown below:

<u>Column 8,</u>
Line 51, replace "therein; and" with -- therein; --.
Line 55, replace "disc; and an"
    with -- disc; and
        an ..................... --.

Signed and Sealed this

Second Day of April, 2002

Attest:

JAMES E. ROGAN
*Attesting Officer*     *Director of the United States Patent and Trademark Office*